United States Patent [19]
Emerson

[11] Patent Number: 5,765,850
[45] Date of Patent: Jun. 16, 1998

[54] TRAILER HITCH

[75] Inventor: Jeffrey T. Emerson, Fridley, Minn.

[73] Assignee: Level Load, Inc., Fridley, Minn.

[21] Appl. No.: 617,388

[22] Filed: Mar. 18, 1996

Related U.S. Application Data

[63] Continuation-in-part of Ser. No. 32,739, Dec. 27, 1994, Pat. No. Des. 370,171.
[51] Int. Cl.⁶ ........................................................ B60D 1/00
[52] U.S. Cl. ................................................... 280/490.1
[58] Field of Search .................... 280/490.1, 494, 280/491.5

[56] References Cited

U.S. PATENT DOCUMENTS

| | | |
|---|---|---|
| D. 244,748 | 6/1977 | Canterbury . |
| D. 296,075 | 6/1988 | Jones . |
| 3,035,856 | 5/1962 | Mleczko et al. . |
| 3,123,382 | 3/1964 | Toland . |
| 3,201,073 | 8/1965 | Buescher et al. . |
| 3,326,576 | 6/1967 | Kothmann . |
| 3,625,545 | 12/1971 | Somers et al. . |
| 3,679,233 | 7/1972 | Baker et al. . |
| 3,700,254 | 10/1972 | Eck . |
| 3,734,540 | 5/1973 | Thiermann . |
| 4,046,398 | 9/1977 | Dunwoody . |
| 4,248,451 | 2/1981 | Usinger . |
| 4,514,132 | 4/1985 | Law et al. . |
| 5,354,087 | 10/1994 | Head . |

OTHER PUBLICATIONS

"Sweets catalog—Hughes Manufacturing, Inc. 06060/HUG 1993".
Boat/U.S. p. 76 Catalog 1996.

*Primary Examiner*—Paul N. Dickson
*Attorney, Agent, or Firm*—Burd, Bartz & Gutenkauf

[57] ABSTRACT

A trailer hitch has a ball coupler mounted on a trailer tongue positioner attached to a trailer tongue. The positioner has a head fastened to the coupler and side arms extended downwardly from the head. Each side arm has a pair of vertical rows of holes. Fasteners extended through selected holes connect the side arms to opposite sides of the trailer tongue to locate the trailer tongue in a position to maintain a downward load on the trailer hitch.

20 Claims, 4 Drawing Sheets

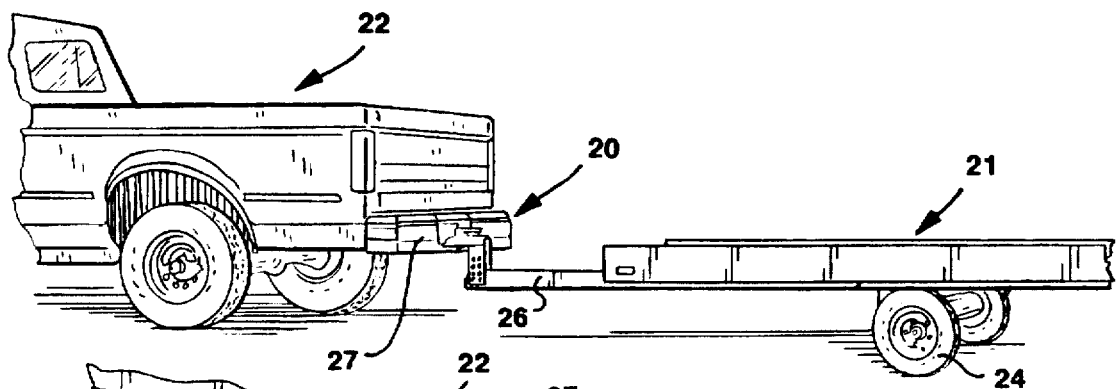
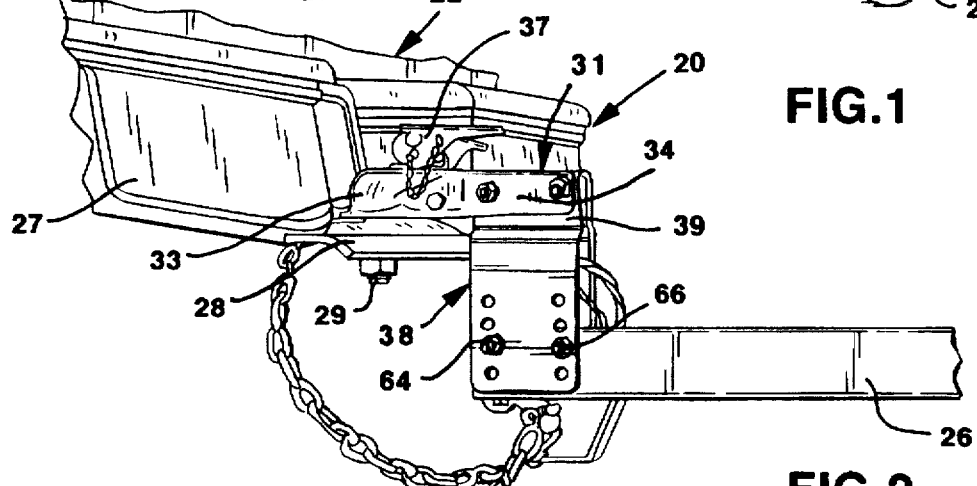
FIG.1
FIG.2
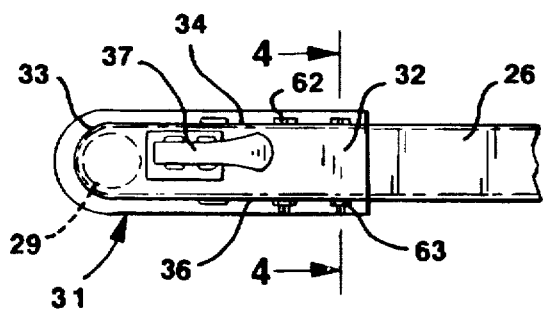
FIG.3
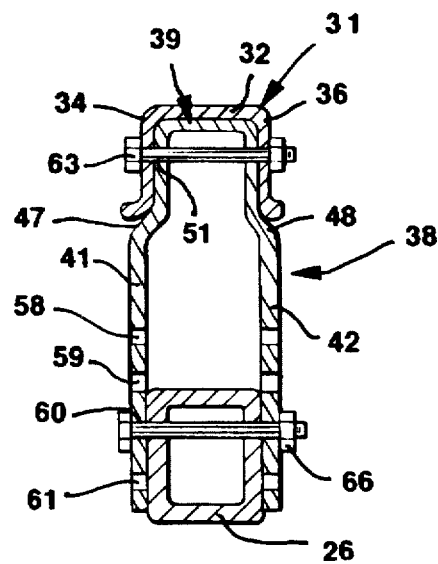
FIG.4

TRAILER HITCH

CROSS REFERENCE TO RELATED APPLICATION

This application is a continuation-in-part of U.S. application Ser. No. 29/032,739 filed Dec. 27, 1994 now U.S. Pat. No. Des. 370,171.

FIELD OF INVENTION

The invention relates to hitches for connecting a motor vehicle to a trailer and more particularly to vertically adjustable hitches for leveling trailers.

BACKGROUND OF THE INVENTION

Passenger automobiles, vans, and light trucks are designed primarily as passenger and cargo carrying motor vehicles. These vehicles are also used to tow trailers, such as cargo, boat and snowmobile trailers. Towing a trailer has an adverse effect on handling, performance, braking, durability and driving economy of the vehicle. The load on a trailer should be distributed so that the tongue load is 9 to 11 percent of the total trailer weight. About 60 percent of the trailer load should be placed in the front half of the trailer and the remainder 40 percent in the rear half of the trailer. Hitches secure to the tongues of the trailers include couplers adapted to be releasable mounted on coupler balls attached to rear bumpers and frame structures of towing vehicles. The vertical positions of the coupler balls of different types of vehicles vary. The coupler balls on sport and utility vehicles and pick-up trucks have relatively high positions. Drop ball mounts are used to lower the positions of the ball mounts so that the tongues of the trailers do not slope rearwardly when the couplers are mounted on the coupler balls and place an undesirable upward force on the hitch. These mounts are connected to structures fixed to the rear of the towing vehicles and extend downwardly toward the road and project rearwardly from the vehicle. The lower ends of the drop ball mounts can hit and scrape the road and pavement when the vehicle moves over a gutter or other depression in the road.

Adjustable trailer hitches have been designed to permit vertical adjustments of the tongues of trailers. Mleczko et al in U.S. Pat. No. 3,035,856 discloses a trailer hitch that has an adjuster having an upright screw threaded through a nut mounted on a bar held by a coupler. The screw is mounted for rotation on a frame secured to the tongue of a trailer. The tongue is secured to the frame. The bar holding the nut is secured to the coupler. The vertical position of the tongue is adjusted by rotating the screw.

A reversible and vertically adjustable hitch for a trailer is disclosed by Toland in U.S. Pat. No. 3,123,382. This hitch has an upright sleeve extended through a hole in the forward end of a tongue. An upright cylindrical member rotatably located in sleeve is held in a selected vertical position with a pin. A coupler is secured to the top end of the cylindrical member. A clevis connector is secured to the lower end of the cylindrical member. The coupler and clevis connector are selectively used by removing the pin, rotating the cylindrical member, and replacing the pin to lock the cylindrical member relative to the sleeve and tongue. This hitch requires modification of a conventional trailer tongue and welding of the sleeve to the tongue and coupler and clevis connector to opposite ends of the cylindrical member.

Another type of an adjustable trailer hitch is disclosed by Head in U.S. Pat. No. 5,354,087. This hitch has a bracket mounted on the trailer. A coupler secured to a plate connected to the bracket is vertically adjustable on the bracket to change the vertical position of the tongue relative to a coupler ball attached to the towing vehicle. The plate is welded to the rear end of the coupler. These hitches require special holes in the trailer tongue and welding of ports. Considerable time, labor, and costs are required to adapt these hitches to conventional trailer tongues.

SUMMARY OF THE INVENTION

The hitch of the invention has a tongue positioner that can be installed on a conventional tongue of a trailer without drilling additional holes or welding parts to the tongue or ball coupler. A conventional ball coupler is mounted on the tongue positioner without welds or drilling of separate holes in the coupler. The tongue is secured to the positioner in a selected vertical location so that the load on the trailer is distributed in a manner whereby the tongue load is about 9 to 11 percent of the total trailer weight. The hitch does not interfere with the turning radius of the trailer. Handles used to lift the hitch and tongue are not required as the tongue positioner has built in lifting structure. The tongue positioner can be installed on a conventional trailer tongue and secured to a conventional ball coupler without special tools with minimum of labor and time.

The coupler has an inverted U-shaped or channel body with generally flat sides and a spherical forward end for accommodating a coupler ball mounted on a towing vehicle. The tongue position has a head with sidewalls that fit within the body of the coupler with the sidewalls located in flat surface engagement with the sides of the coupler. Fasteners secure the head to the coupler. The fasteners are bolt and nut assemblies extended through the standard holes in the coupler and aligned holes in the sidewalls of the head. Downwardly directed side arms are joined to the head with outwardly directed shoulders. The side arms are laterally spaced from each other to allow the trailer tongue to be located between the side arms. Fasteners, such as bolt and nut assemblies secure the side arms to opposition sides of the tongue. The side arms have vertical rows of holes to accommodate the bolt and nut assemblies at selected elevations so that the vertical position of the tongue can be changed to maintain a downwardly directed load on the hitch. The bolt and nut assemblies extend through the standard holes in the tongue. The head, shoulders and side arms comprise a one-piece steel member. The holes are placed in the member at the place of fabrication so the trailer user does not have to drill holes to install the positioner on the trailer tongue and coupler. An alternative tongue positioner has a box beam head with flat plates providing the side arms. The plates are secured to opposite sides of the beam. The beam has a width to accommodate a conventional ball coupler. Rows of vertical spaced holes in the plates allow the trailer tongue to be located in a selected vertical position to achieve a desired downwardly directed loan on the hitch.

The detailed disclosure of the hitch and tongue positioner and further advantages thereof are more fully herein after shown and described in the accompanying drawings and specification including the claims.

DESCRIPTION OF THE DRAWINGS

FIG. 1 is perspective view of a trailer connected to a pick up truck with the hitch of the invention;

FIG. 2 is an enlarged side elevational view of the hitch of the invention;

FIG. 3 is a top plan view of the hitch of FIG. 2;

FIG. 4 is an enlarged sectional view taken along the line 4—4 of FIG. 3;

3

Figure 5:
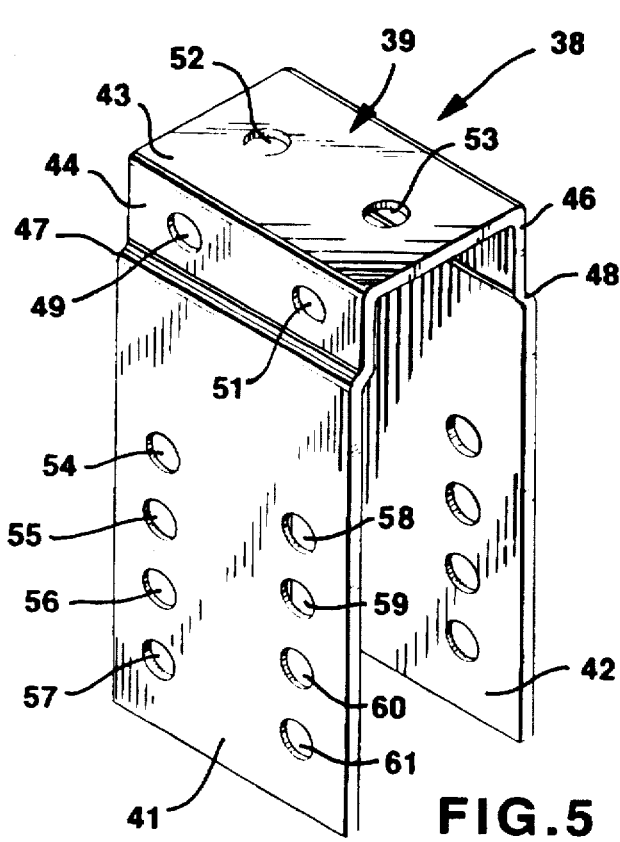
Figure 6:
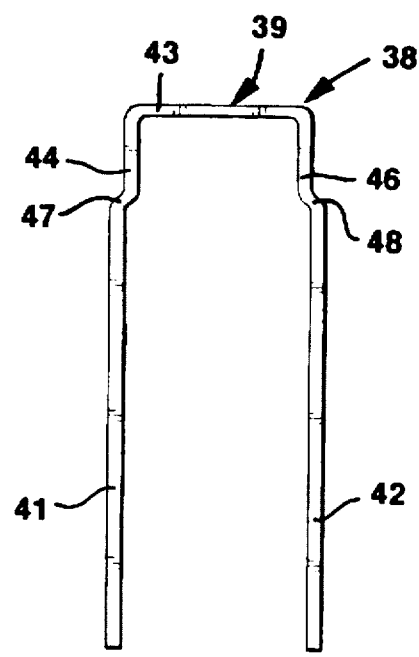
Figure 7:
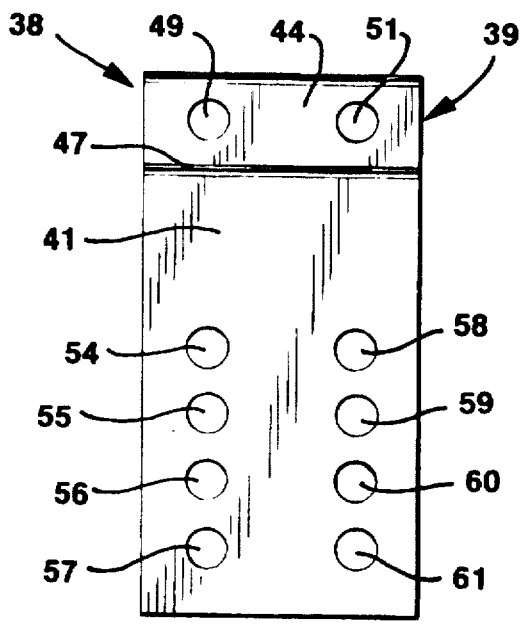
Figure 8:
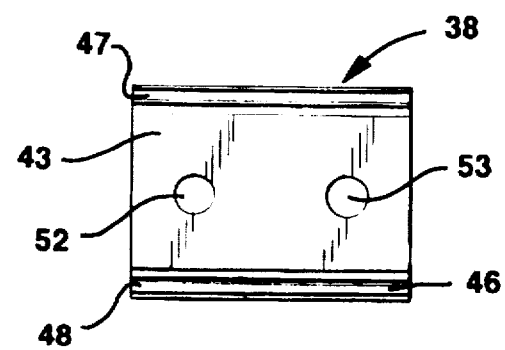
Figure 9:
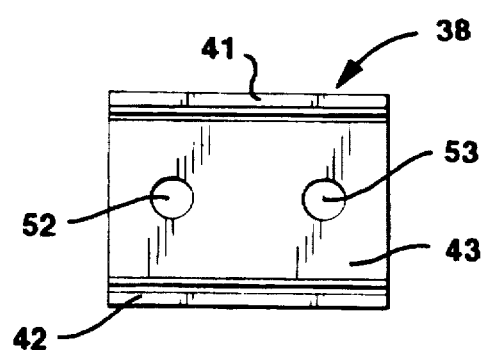
Figure 10:
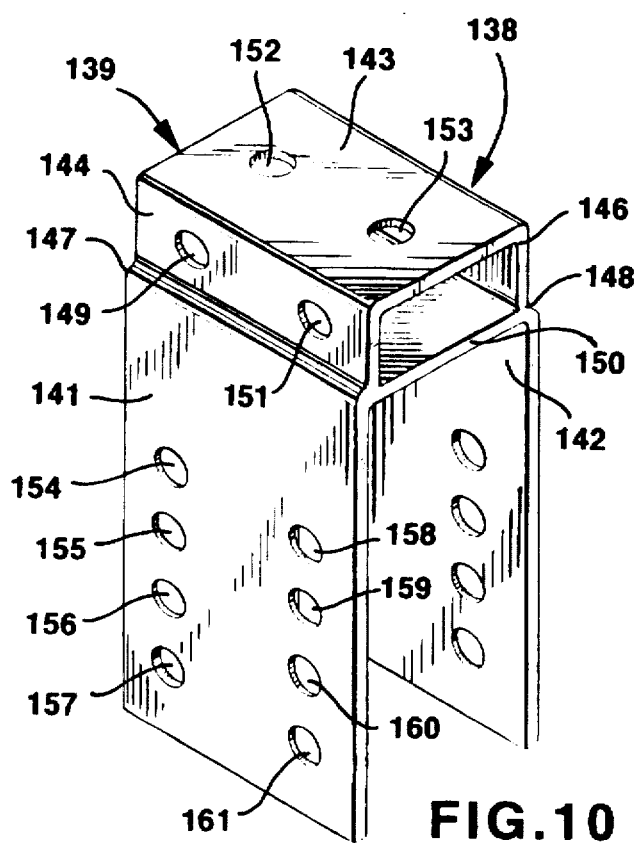
Figure 11:
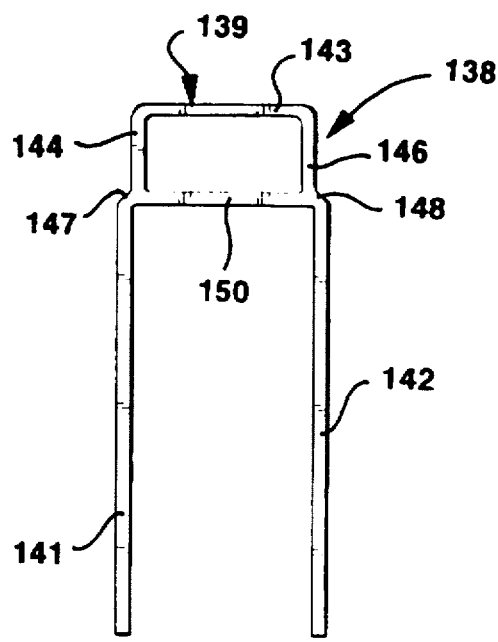
Figure 12:
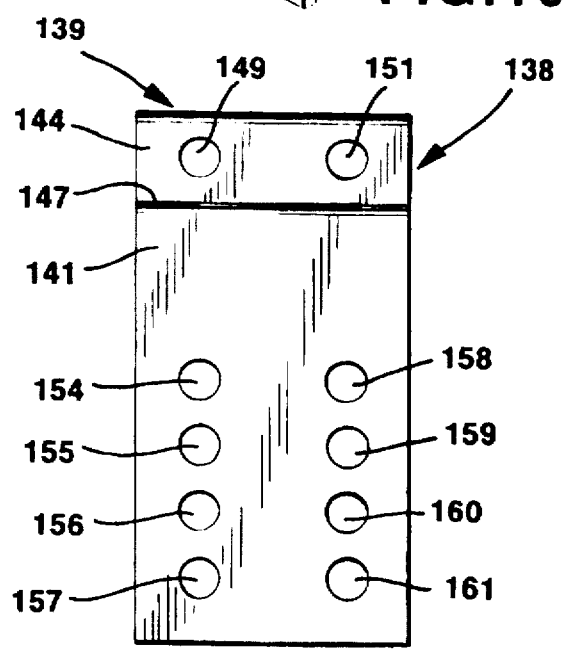
Figure 13:
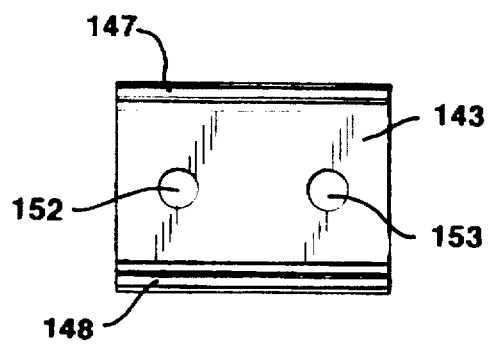
Figure 14:
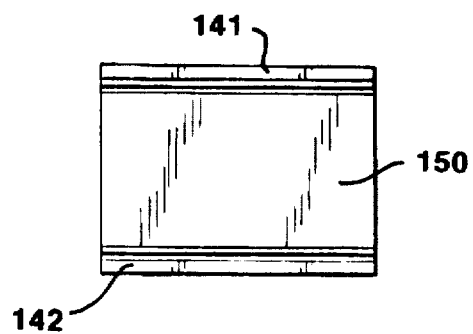
Figure 15:
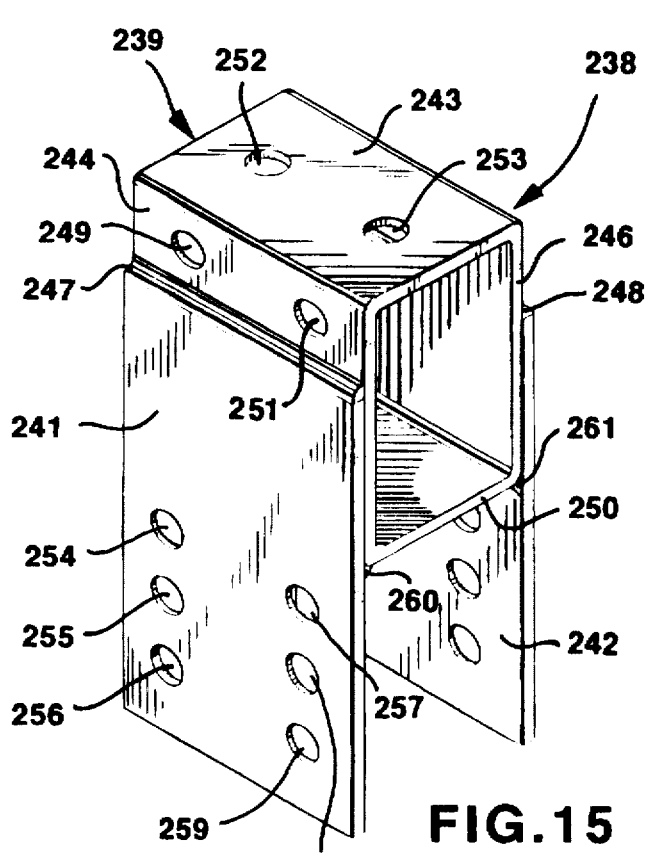
Figure 16:
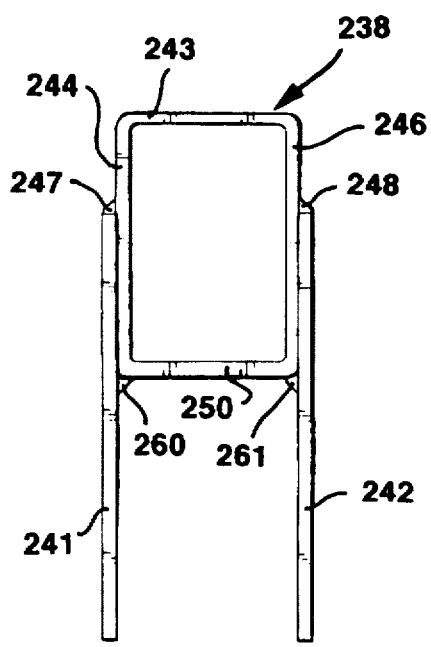
Figure 17:
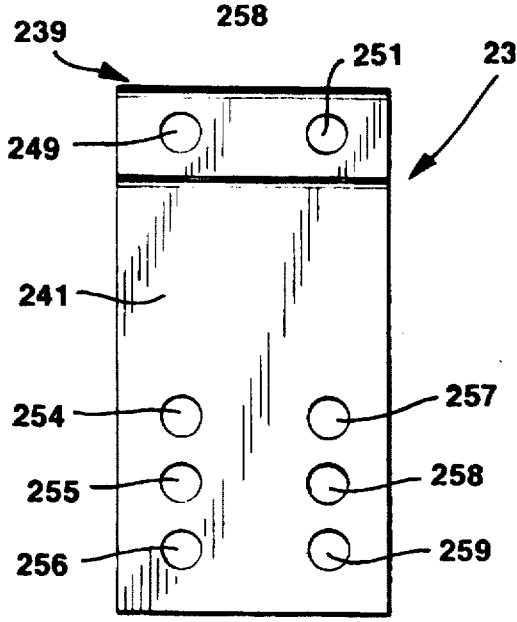
Figure 18:
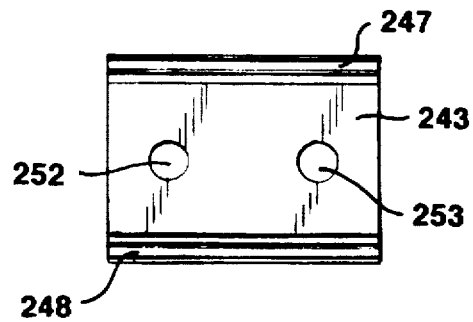

FIG. 5 is a perspective view of the tongue positioner of the hitch shown in FIG. 2;

FIG. 6 is a side elevational view of the tongue positioner of FIG. 5;

FIG. 7 is an end elevational view of the tongue positioner of FIG. 5;

FIG. 8 is a top plan view of the tongue positioner of FIG. 5;

FIG. 9 is a bottom plan view of the tongue positioner of FIG. 5;

FIG. 10 is a perspective view of a first modification of the tongue positioner;

FIG. 11 is an end elevational view of the tongue positioner of FIG. 10;

FIG. 12 is a side elevational view of the tongue positioner of FIG. 10;

FIG. 13 is a top plan view of the tongue positioner of FIG. 10;

FIG. 14 is a bottom plan view of the tongue positioner of FIG. 10;

FIG. 15 is a perspective view of a second modification of the tongue positioner;

FIG. 16 is an end elevational view of the tongue positioner of FIG. 15;

FIG. 17 is a side elevational view of the tongue positioner of FIG. 15;

FIG. 18 is a top plan view of the tongue positioner of FIG. 15; and

Figure 19:
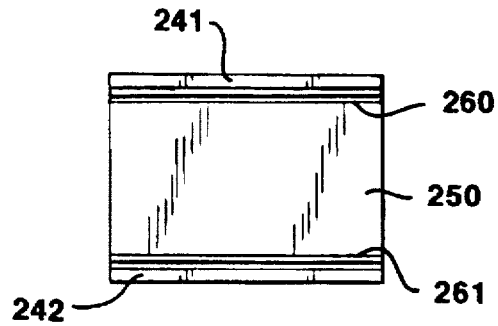

FIG. 19 is a bottom plan view of the positioner of FIG. 15.

DESCRIPTION OF PREFERRED EMBODIMENTS

Referring to FIG. 1, there is shown the hitch of the invention indicated generally at 20 connecting the rear of a motor vehicle 22 to a trailer 21. Motor vehicle 22 is a pick up truck used to tow trailer 21. Vehicle 22 can be a sport vehicle, utility vehicle, van or automobile used to tow trailers including boat trailers. Trailer 21 has generally flat platform mounted on a wheel assembly 24 and as a forwardly directed tongue 26 secured to hitch 20.

The rear bumper 27 of truck 22 has a generally horizontal center shelf 28 that supports a conventional coupler ball 29. A coupler 31 is releasable mounted on ball 29. Coupler 31 has an inverted channel shaped body 32 having a forward spherical shaped head 33 adapted to accommodate ball 29. Body 32 has downwardly directed generally flat sidewalls 34 and 36. The inside surfaces of sidewalls 34 and 36 are flat and parallel to each other. A releasable latch mechanism 37 mounted on body 32 cooperates with ball 29 to secure hitch 20 to bumper 27. Latch mechanism 37 can be released whereby the coupler 31 can be removed from ball 29. Coupler 31 is a conventional trailer coupler.

A connector or tongue positioner indicated generally at 38 connects trailer tongue 26 to coupler 31. Tongue positioner 38 holds tongue 26 of a trailer in a selected downwardly and forwardly inclined position so that the tongue load is about 9 to 11 percent of the total trailer weight. Tongue positioner 38 has an inverted U-shaped head 39 and a downwardly directed flat side arms 41 and 42. Head 39 has a generally flat top wall 43 and downwardly directed flat sidewalls 44 and 46. Outwardly directed shoulders 47 and 48 join sidewalls 44 and 46 to side arms 41 and 42. Sidewalls 44 and 46 have a plurality of holes 49 and 51 adapted to accommodate fasteners, shown as nut and bolt assemblies 62 and 63, to secure connector 38 to coupler 31. The flat outside surfaces of sidewalls 44 and 46 are in surface engagement with the inside flat surfaces of sidewalls 34 and 36 of coupler 31. The top surface of top wall 43 is in surface engagement with the bottom surface of body 32 as seen in FIG. 4. The head 39 is located with a relatively close fit relative to the insides surfaces of coupler 31 providing the tongue positioner with lateral and vertical stability and strength and transverse torsional strength.

As seen in FIGS. 5, 8 and 9, top wall 43 has a pair of holes 52 and 53 adapted to receive nut and bolt assemblies for a coupler having a vertical holes.

Referring to FIGS. 4, 5 and 7, side arms 41 and 42 are laterally spaced flat members having two rows of vertically spaced holes 54, 55, 56, 57 and 58, 59, 60, 61. As shown in FIG. 4, side arms 41 and 42 are located adjacent opposite flat sides of tongue 26 and are secured there to with a plurality of fasteners, shown as nut and bolt assemblies 64 and 66. The horizontal position or elevation and inclination of tongue 26 can be adjusted by repositioning the nut and bolt assemblies 64 and 66 in one of the holes 58–61 to adjust the tongue load on the hitch between 9 to 11 percent of the total trailer weight. Tongue 26 is located in a slight forward downward incline so that the weight of the trailer tongue 26 is transferred downwardly by coupler 31 to ball 29 and rear bumper 27 of vehicle 22.

The vertical planes of the inside surfaces of side arms 41 and 42 are substantially parallel to each other and in substantial alignment with the vertical planes of the outside surfaces of sidewalls 44 and 46 of head 39. The width or space between side arms 41 and 42 is substantially the same as the transverse dimension between the outside surfaces of sidewalls 44 and 46 of head 39. This allows the use of a conventional coupler mounted on a trailer tongue to be used with and mounted on tongue positioner 38.

When coupler 31 is removed from coupler ball 29, the lower ends of side arms 41 and 42 and the front of tongue 26 engage the ground. Tongue positioner 38 locates coupler 31 above the ground or floor when the trailer is not used. The elevated location of coupler 31 keep it away from dirt, soil, snow and grime located on the ground.

As shown in FIGS. 1 and 4, the back ends of coupler 31 and head 39 are open. The person connecting trailer 21 to coupler ball 29 places his hand under the top wall of head 39 to lift hitch 29 and trailer tongue 26 off the ground. The hitch 20 has built in lifting structure so that an additional handle is not required to facilitate lifting of the hitch trailer tongue.

Tongue positioner 38 is a one piece high strength metal member. The holes 49 and 51 in the sidewalls 44 and 46 of head 39 and holes 54–61 in side arms 41 and 42 are made at the place of fabrication. Additional holes are not drilled at the place of assembly on the trailer tongue and fastening of the coupler 31 to head 39. An example of a one piece tongue positioner is an inverted U-shaped 1018 steel member that is carburized by heat treatment. The steel member has a Rockwell hardness between 38 to 43 Rc. The outside of the member has a chrome finish. Other types of high strength metals and materials can be used to make tongue positioner 38.

A first modification of the tongue positioner useable in a hitch to connect a trailer to a towing vehicle is indicated generally at 138 in FIGS. 10 to 14. The parts of positioner 138 that correspond to the parts of positioner 38 have the same reference number with a prefix 1. Tongue Positioner 138 has an inverted U-shaped head 139 joined to downward directed side arms 141 and 142. Head has a flat top wall 143 and downwardly directed flat side walls 144 and 146. Walls 144 and 146 are parallel to each other. The lateral dimension between the outside surfaces of walls 144 and 146 is substantially the same as the lateral dimension between the inside surfaces of the sides of body 32 of coupler 31 whereby head 139 can be located with coupler 31 in surface engagement with the inside of coupler 31. When head 139 is within coupler 31, the top wall 143 of head 139 is flat against the top of coupler 31. This provides side arms 141 and 142 with stability and strength. Shoulders 147 and 148 strengthen side arms 141 and 142 and locate side arms 141 and 142 is vertical planes located laterally outside of the vertical planes of side walls 144 and 146 head 139. The vertical planes of the inside surfaces of side arms 141 and 142 are in substantial alignment with the vertical planes of the outside surfaces of sidewalls 144 and 146 of head 139. This allows the use of a conventional coupler mounted on the trailer tongue to be used with and mounted on tongue positioner 138. The coupler is removed from the trailer tongue and attached with nut and bolt assemblies to the head of the tongue positioner 138. A conventional trailer coupler fits on the trailer tongue and head 139 of tongue positioner 138. As shown in FIGS. 10 and 12, side arms 141 and 142 have two vertical rows of holes 154, 155, 156, 157 and 158, 159, 160, 161. Each row of holes has four holes. The number of holes in each row tongue positioner 138 with lateral and vertical stability and strength. A cross wall or plate 150 secured to the lower edges of side walls 144 and 146 prevents spreading of head 138 and increases the lateral strength of head 138 and side arms 141 and 142.

Head side walls 144 and 146 have holes 149 and 151 for accommodating nut and bolt assemblies for connecting tongue positioner 138 to a coupler. Top wall 143 has holes 152 and 153 for accommodating nut and bolt assemblies used to attach a coupler with top holes to tongue positioner 138.

Outwardly directed horizontal linear shoulders 147 and 148 extended along the bottom edges of side walls 144 and 146 join side walls 147 and 148 can vary to provide selected vertical adjustment of trailer tongue and the downward and forward inclination of the trailer so that 9 to 11 percent of the total trailer weight is applied to the trailer tongue. Releasable fasteners, such as nut and bolt assemblies, extended through selected aligned holes in side arms 141 and 142 and the trailer tongue connect tongue positioner 138 to the trailer tongue in the same manner as shown in FIG. 4.

A second modification of the tongue positioner useable in a hitch to connect a trailer to a towing vehicle is indicated generally at 238 in FIGS. 15 to 19. The parts of positioner 238 that correspond to the parts of positioner 38 have the same reference numbers with a prefix 2. Tongue positioner 238 has an inverted U-shaped head 239 joined to downward directed side arms 241 and 242. Head 239 has a flat top wall 243 and downwardly directed flat side walls 244 and 246. Walls 244 and 246 are parallel to each other. The lateral dimension between the outside surfaces of walls 244 and 246 is substantially the same as the lateral dimension between the inside surfaces of the sides of the channel body of coupler 31 whereby head 239 can be located within coupler 31 in surface engagement with the inside of coupler 331. When head 239 is within coupler 31, the top wall 243 of head 239 is flat against the top of coupler 31. This provides tongue positioner 138 with lateral and vertical stability and strength. A cross wall or plate 250 secured to the lower edges of side walls 244 and 246 prevents spreading of head 238 and increases the lateral strength of head 238 and side arms 241 and 242. Walls 243, 244, 246 and 250 are a one piece box beam.

Head side walls 244 and 246 have holes 249 and 151 for accommodating nut and bolt assemblies for connecting tongue positioner 238 to the coupler. Top wall 243 has holes 252 and 253 for accommodating nut and bolt assemblies used to attach a coupler with top holes to tongue positioner 238.

Outwardly directed horizontal linear shoulders 247 and 248 extend along the bottom edges of side walls 144 and 146 are welds that join side walls 147 and 148 to side arms 241 and 242. Additional welds 260 and 261 secure wall 250 to middle sections of side arms 241 and 242. The vertical planes of the inside surfaces of side arms 141 and 142 are substantially parallel to the vertical planes of the outside surfaces of side walls 244 and 246 of head 238. This allows the trailer owner to use the conventional coupler mounted on the trailer tongue with tongue positioner 238. The coupler is removed from the trailer tongue and attached with nut and bolt assemblies to the head of the tongue positioner 238. A conventional trailer coupler fits on the trailer tongue and head 239 of tongue positioner 238.

As shown in FIGS. 15 and 17, side arms 241 and 242 are flat plates or members having two vertical rows of holes 254, 255, 256 and 257, 258, 259. Each row of holes has three holes. The number of holes in each row can vary to provide selected vertical adjustment of trailer tongue and the downward and forward inclination of the trailer so that 9 to 11 percent of the total trailer weight is applied to the trailer tongue. Releasable fasteners, each as nut and bolt assemblies, extended through selected aligned holes in side arms 241 and 242 and the trailer tongue connect tongue positioner 238 to the trailer tongue in the same manner as shown in FIG. 4.

Modifications of the parts, arrangement of parts and materials of the hitch including the tongue positioner, may be made by those skilled in the art without departing from the invention as set forth in the appended claims.

I claim:

1. A hitch for connecting a tongue of a trailer to a coupler ball mounted on a towing vehicle comprising: a coupler having a body with sides and means adapted to be mounted on the coupler ball, a tongue positioner having a head and side arms joined to the head, said head having sidewalls with outside surfaces located in engagement with the sides of the body, first fastening means securing the body of the coupler to the head, said side arms are downwardly extended generally flat members laterally spaced from each other located in vertical planes laterally positioned outwardly of the sidewalls of the head and extend downwardly from the head to accommodate the tongue of the trailer between the side arms, the lateral space between the flat members of the side arms is substantially the same as the lateral distance between the outside surfaces of the sidewalls of the head, each of said side arms having a plurality of vertical rows of holes, and second fastening means located in selected holes in the side arms for securing the tongue of the trailer to the side arms whereby the trailer tongue can be located in a selected location so that a portion of the load on the trailer is directed downwardly to the coupler ball through said coupler.

2. The hitch of claim 1 wherein: the sides of the body of the coupler being generally flat, said sidewalls of the head being generally flat and located in surface engagement with the flat sides of the body of the coupler.

3. The hitch of claim 2 wherein: said sides of the coupler and sidewalls of the head have aligned holes, said first fastening means located in the aligned holes for securing the coupler to the head.

4. The hitch of claim 3 wherein: the first fastening means comprise nut and bolt assemblies.

5. A hitch for connecting a tongue of a trailer to a coupler ball mounted on a towing vehicle comprising: a coupler having a body with sides and means adapted to be mounted on the coupler ball, the body of the coupler includes a top wall joined to the sides, said sides being generally flat and providing with the top wall a channel, a tongue positioner having a head and side arms with sidewalls having outside surfaces joined to the head, said sidewalls of said head being generally flat, said sidewalls and a top of said head located in surface engagement with the sides and top wall of the coupler, first fastening means securing the body of the coupler to the head, said side arms being laterally spaced from each other and extended downwardly from the head to accommodate the tongue of the trailer between the side arms, each of said side arms having a plurality of vertical rows of holes, and second fastening means located in selected holes in the side arms for securing the tongue of the trailer to the side arms whereby the trailer tongue can be located in a selected location so that a portion of the load on the trailer is directed downwardly to the coupler ball through said coupler.

6. The hitch of claim 5 wherein: said sides of the coupler and sidewalls of the head have aligned holes, said first fastening means located in the aligned holes for securing the coupler to the head.

7. The hitch of claim 5 wherein: the side arms are downwardly extended generally flat members located in vertical planes laterally positioned outwardly of the sidewalls of the head.

8. The hitch of claim 7 wherein: the lateral space between the flat members of the side arms is substantially the same as the lateral distance between the outside surfaces of the sidewalls of the head.

9. A hitch for connecting a tongue of a trailer to a coupler ball mounted on a towing vehicle comprising: a coupler having a body with sides and means adapted to be mounted on the coupler ball, a tongue positioner having a head and side arms joined to the head, said head having sidewalls with outside surfaces located in engagement with the sides of the body, first fastening means securing the body of the coupler to the head, said side arms being laterally spaced from each other and extended downwardly from the head to accommodate the tongue of the trailer between the side arms, the side arms are downwardly extended generally flat members located in vertical planes laterally positioned outwardly of the sidewalls of the head, each of said flat members have two vertical rows of holes, and second fastening means located in selected holes in the flat members and holes in the tongue of the trailer for securing the tongue of the trailer to the side arms whereby the trailer tongue can be located in a selected location so that a portion of the load on the trailer is directed downwardly to the coupler ball through said coupler.

10. The hitch of claim 9 wherein: the body of the coupler includes a top wall joined to the sides, said sides being generally flat and providing with the top wall a channel, said sidewalls of said being generally flat, said sidewalls and a top of said head located in surface engagement with the sides and top wall of the coupler.

11. The hitch of claim 10 wherein: said sides of the coupler and sidewalls of the head have aligned holes, said first fastening means located in the aligned holes for securing the coupler to the head.

12. The hitch of claim 9 wherein: the lateral space between the flat members of the side arms is substantially the same as the lateral distance between the outside surfaces of the sidewalls of the head.

13. A tongue positioner for a hitch having a coupler used to connect a tongue of a trailer to a towing vehicle comprising: a head attachable to the coupler, said head including generally flat sidewalls having outside surfaces, side arms attached to the head comprising generally flat members extended downwardly from the head and located in vertical planes laterally positioned outwardly of the sidewalls of the head, and shoulders joining the sidewalls of the head to the flat members, each of said side arms having a plurality of vertical rows of holes adapted to accommodate fasteners for connecting a tongue of a trailer to the side arms at selected elevations.

14. The tongue positioner of claim 13 wherein: each of said flat members have two vertical rows of laterally spaced holes.

15. The tongue positioner of claim 13 wherein: the head, side arms, and shoulders are a one piece metal member.

16. The tongue positioner of claim 13 including: a cross wall extended between and secured to the side arms.

17. The tongue positioner of claim 13 including a flat cross wall extended between and secured to the side arms adjacent said shoulders.

18. A tongue positioner for a hitch having a coupler used to connect a tongue of a trailer to a towing vehicle comprising: a head attachable to the coupler, said head including sidewalls having generally flat outside surfaces, side arms attached to the head, said side arms comprising a pair of generally flat members laterally positioned relative to each other and extended downwardly from the head, the lateral space between the flat members of the side arms is substantially the same as the lateral distance between the outside surfaces of the head, each of said flat members having a plurality of vertically arranged holes adapted to accommodate fasteners for connecting a tongue of a trailer to said flat members at selected elevations.

19. The tongue positioner of claim 18 wherein: the head and side arms are a one-piece metal member.

20. The tongue positioner of claim 18 including: a cross wall extended between and secured to the side arms.

* * * * *